Nov. 1, 1966     G. N. PERNA     3,282,370
METHOD FOR REFLECTING AND REFRACTION SEISMIC PROSPECTIONS

Filed Nov. 12, 1963

*INVENTOR.*
GIULIANO N. PERNA
BY
ATTYS.

United States Patent Office 3,282,370
Patented Nov. 1, 1966

3,282,370
METHOD FOR REFLECTING AND REFRACTION SEISMIC PROSPECTIONS
Giuliano N. Perna, Viale Bolognini 18/B, Trento, Italy
Filed Nov. 12, 1963, Ser. No. 322,801
4 Claims. (Cl. 181—.5)

This invention relates to a new method for reflective and refractive seismic prospections particularly suited for the elimination of noise interference resultant from the reflective properties of surface soil and surface rocks.

Seismic investigation has increased in importance relative to other geophysical determination methods in the last few years, particularly in underground prospections in search of hydrocarbons, and other mineral substances. The principle of seismic investigations is to record the elastic waves produced by the explosion of a charge placed some distance underground, which waves are then reflected and refracted by the substrata layers below the charge. Thus, two methods have been utilized for seismic investigation, namely, refraction and reflection. In the refraction method only the "earliest waves" to arrive at the geophones are measured. In the reflection method, also "subsequent waves," or those waves reflecting from any reflective layer, are measured. The locations of the geophones and the characteristics of seismic charges and recording differ considerably in the two methods. However, both methods are often jointly applied for examination of the same area.

Heretofore it has been known that because the geophones gather all vibrations, including the reflection and refraction vibrations, there is a considerable amount of interference in seismographic readings which at times makes them extremely difficult if not impossible to interpret. Thus, the actual problem about geoseismic investigation is to better, as far as possible, the ratio between useful signals and undesirable noise. In order to better this ratio there have been efforts to determine the most opportune depth for the seismic charge detonation, as well as the most opportune amount of detonation. Also, the number of geophones utilized has been varied, as well as the location of the geophones. Further, the method of multiplying the seismic charges in a set of distanced holes has been attempted. However, even utilizing some of the aforesaid methods, better results of signal to noise ratio are not always obtained, with the further disadvantage that the methods of multi-explosions and a plurality of geophones are costly and time consuming.

Other methods have been attempted which include detonating the seismic charge at ground level or in the air, but these methods are extremely dangerous and damaging, and so can only be used in deserted areas.

One of the major sources of noise is resultant from those waves propagated upwardly by the seismic explosion, which when they reach the earth's surface reflect a portion of the incident energy off the earth's surface downwardly thereby creating a reflected wave which interferes with the direct waves from the charge that propagate downwardly. A true reflected wave is most often created by a wave propagated downwardly from the seismic charge which wave is then reflected off some substrata layer below the seismic charge and thence to the earth's surface to be measured by the geophones. Thus, in summary, the upwardly propagated waves reflecting off the earth's surface become false downward waves, and create a false noise picture which greatly complicates the proper determination of the seismic prediction.

It is the general object of the invention to avoid and overcome the foregoing and other difficulties of and objections to prior art practices by the creation of an intermediate, artificial stratum layer on the earth's surface where the propagation velocity of the seismic waves may be higher than in the earth's atmosphere, and lower than in the underlying rocks or substrata layers so that an upward succession of media is created to gradually decrease the propagation velocities of the seismic waves in order to greatly reduce false downward reflections from the earth's surface.

A further object of the invention is to provide a simple, highly effective, easily installed, and low cost layer on the earth's surface in an area above the shot point and which layer markedly decreases the possibilities of reflection from the earth's surface downward of upwardly propagating seismic waves.

A further object of the invention is to provide a method to effect seismic prediction which is very inexpensive, yet greatly increases the signal to noise ratio to thereby provide much more accurate seismic prediction results.

The aforesaid objects of the invention, and other objects which will become apparent as the description proceeds, are achieved by providing a method to conduct reflective and refractive seismic prospections which includes the steps of positioning a seismic charge beneath the earth's surface, and positioning a layer between the earth's surface and the earth's atmosphere in the area overstanding the seismic charge, which layer is capable of diminishing the amount of energy in seismic waves resultant from a seismic detonation, which waves propagating upwardly normally have a substantial portion of their incident reflected downwardly from the earth's surface.

For a better understanding of the invention reference should be had to the accompanying drawings, wherein.

This procedure described hereinafter is based on the application of Fresnel's formula to the seismic method, as there is great analogy between the laws that govern the propagation of light and those which govern the propagation of elastic waves. When a ray of light passes from air into glass of an objective or any other optical medium, the energy of the ray will be partly refracted as it passes through the glass and partly reflected by the air/glass surface. The part of energy that is lost depends on the refraction indexes of the air and glass, and can be calculated by Fresnel's formula, wherein the refraction index of a surface is the ratio of the propagation velocities of light waves in air to the propagation velocity of light waves in glass. The loss which is caused by reflection can be eliminated by treating the objective with a transparent stratum of, for example, magnesium floride. The coating must have a refraction index such that the energy of the reflected ray from the air/coating surface is equal to the energy of the reflected ray from the glass/coating surface, and be of a thickness of substantially ½ wave length of the light ray to thereby effectively annull the air/coating surface reflection with the glass/coating reflection because of their mutual interference since they are out of phase by substantially ½ wave length.

It is well known that, in photography if these conditions are fulfilled, it is possible to obtain the elimination of the reflections degrading the photographic image. A surface, for instance, properly treated, transmits up to 99% of the incident light. For instance, a four-lens subjective-glass with eight air/glass surfaces, can transmit about 92% of the incident light, whereas the same object-glass, if not treated, presents the transmission of only about 70% of the incident light.

Figure 1:
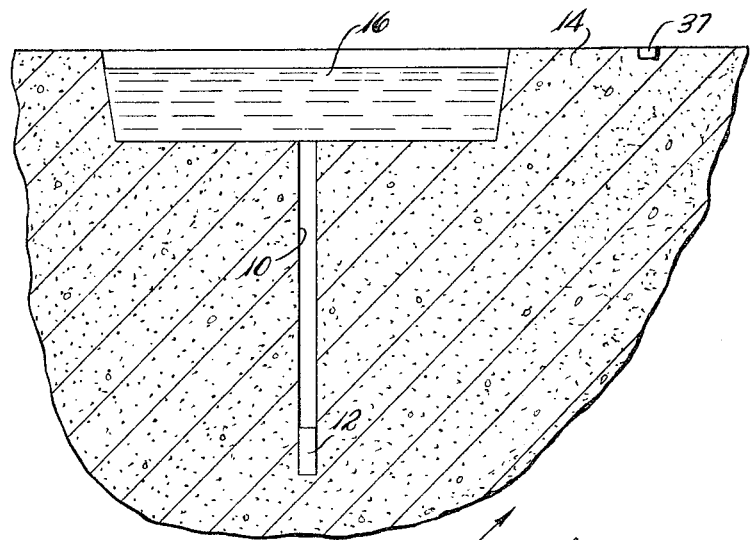
FIGURE 1 is a broken away, vertical section of the earth's surface showing a seismic charge placed beneath the earth's surface, with the earth's surface altered to carry a layer comprising one embodiment of the invention.

With specific reference to the form of the invention illustrated in FIGURE 1 of the drawings, the numeral 10 indicates a drilled hole adapted to receive an explosive charge 12 with the surface of the earth indicated by numeral 14. A blanket of water 16 is provided at the top of the hole 10 to absorb the shock waves coming to the surface of the earth 14, resultant from the detonation of the charge 12, thereby reducing downward reflection of the upwardly propagating waves to a much greater extent than if the water layer 16 were not provided. The reduction of substantial elimination of downward reflection of upwardly propagating seismic waves greatly reduces the noise interference normally detected when measuring the waves resultant from a seismic detonation.

The layer 16 presents a perfect analogy with the anti-reflection layer spread on optical surfaces for the purpose of increasing the light-energy transmitted by optical media. While water is shown in FIGURE 1 as comprising the layer 16, a plurality of other substances such as mud, or any other liquid or solid substance which will provide the effect of absorbing the energy of the upwardly propagating seismic waves in order to substantially eliminate any reflection downwardly would satisfy the requirements of the invention.

Figure 2:
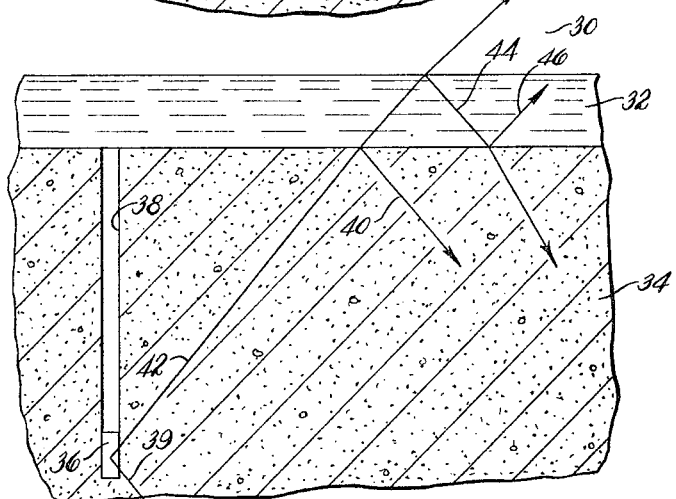
FIGURE 2 is a graphic illustration of the wave patterns resultant from a seismic detonation.

In order to better understand the principles which apply to the new method, reference should be had to FIGURE 2, wherein numeral 30 represents the surface layer, normally air, the numeral 32 represents the artificial weathering intermediate layer, normally water, and the numeral 34 represents the substrata layer, clay, limestone, or other rocks. The seismic charge 36 is placed in the bottom of access hole 38 as described heretofore. Generally, the depth of the hole may be varied from about 5 to 150 feet but usually will be between 30 to 60 feet. At least one geophone 37 is positioned along the earth's surface at suitable predetermined locations and these instruments are connected by conventional means with a recording truck, not shown.

Interference with a downwardly directed sound wave 39 is paralleled by a reflected wave 40 which results from upwardly propagated ray 42. If wave 40 is in opposition to the phase of wave 39, the reflected wave 40 will cause an interferring beat, depending upon the strength of wave 40. Note further that wave 42 is refracted through weathering layer 32 and a second reflecting wave 44 results where wave 42 engages the weathering/air boundary 30–32. However, usually the strength of the second reflected wave 44 is not of sufficient magnitude to cause any interference. It is the primary reflected wave 40 which causes the interfering noises in seismic prospection.

The calculation of the reflected energy of any single wave, for example wave 42 with reflected wave 40, may be approximately by the use of Fresnel's formula. For a ray impinging substantially normal to a boundary between two layers, the formula can be reduced to $$I = I_0 \left(\frac{n-1}{n+1}\right)^2$$

where $I$ equals the intensity of reflected ray, $I_0$ equals the intensity of the impinging ray, and $n$ equals the ratio of the reflective index of the material the ray is impinging upon divided by the material the ray is traveling through or the velocity of sound through the traveling material ($V_2$) divided by the velocity of sound in the impinging material ($V_1$).

Thus, assuming the velocity of sound in air to be approximately 300 meters per second, indicated by $V_1$; the velocity of sound in water equals approximately 1000 meters per second, indicated by $V_2$; the velocity of sound in clay equals approximately 1800 meters per second, indicated by $V_3$; and the velocity of sound in limestone equals approximately 2400 meters per second, indicated by $V_4$.

Therefore, a ray, such as ray 42 in FIGURE 2, impinging from clay into air would have downward reflected energy of $$I = I_0 \left(\frac{\frac{1800}{300}-1}{\frac{1800}{300}+1}\right)^2 = I_0 \left(\frac{5}{7}\right)^2 = I_0 \frac{25}{49} \simeq I_0 51\%$$

which equals about 51% of the incident energy. A downward reflection of this intensity can cause considerable interference in the seismic readings.

However, assuming the artificial weathering layer to be used, is, for instance, water, the downward reflection intensity becomes $$I = I_0 \left(\frac{1800/1000-1}{1800/1000+1}\right)^2 = I_0 \left(\frac{-4/5}{+14/5}\right)^2 = I_0 \frac{.64}{7.85} \simeq I_0 8\%$$

or about 8%. Therefore, the reflected energy, which was over 51% with no weather layer, decreases to only about 8% which is practically negligible and will substantially reduce any possible interference to the seismic recordings.

Similar calculations can be made for utilizing the artificial weathering or intermediate layer with limestone. In this case the downward reflected energy is 60% and reduces to 17% with the artificial intermediate stratum.

Thus, it is seen analytically that a substantial diminution in downward reflected interferring waves is obtained by utilizing an intermediate or artificial weathering layer between the seismic charge and the surface.

The most appropriate depth of the charge with relation to layer 32 is so the rays 39 and 40 will be in phase, rather than out of phase. This further reduces the interference. However, due to soil conditions, expense and measurement desired, the depth of the charge may vary within wide limits, and as indicated, be within the weathering or intermediate layer or even above it.

The width of the artificial weathering layer 32 is determined by the critical angle of upwardly propagating ray 42. The critical angle as determined by Fresnel, is defined by the ratio:

$$\text{SINE CRITICAL ANGLE } \mathrel{\rule{0.7em}{0.4pt}\rule{0.4pt}{0.6em}} = n = \frac{V_1}{V_2} = \frac{\text{air}}{\text{limestone}} = \frac{300}{2400} = .125 = 7°$$

Thus, assuming a charge depth of 50 feet, and an air to limestone ratio as indicated in the above ratio:

radius = depth·tangent critical angle = 50·.122 = 5.3 ft.

diameter = 10.6 ft.

Thus, it is seen that only a reasonable and easily obtainable width is needed to achieve the purposes of the invention.

Therefore, all upwardly propagating rays with greater inclinations than 7° relative to the vertical will be reflected downwardly according to the principles described heretofore, and thus cannot be eliminated and are not a source of the undersirable interference which this invention eliminates. Other methods may be utilized to determine the width of the artificial weathering or intermediate layer. However, it is apparent that the width of the layer can vary from about 5 feet to about 20 feet which puts it within reasonable limits to be easily achieved according to the methods of the invention. Obviously, soil and surface conditions will vary, which will necessitate some experimentation to determine the most desirable charge depth, weathering layer thickness, and weathering layer circumference, but these limitations are reasonable and easily met.

Figure 3:
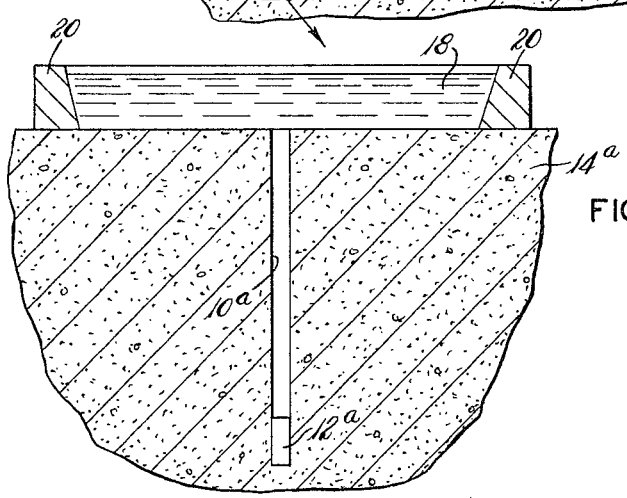
FIGURE 3 is a broken away, vertical section of the earth, similar to FIGURE 1, showing another embodiment of the invention.

Another embodiment of the invention is shown in FIGURE 3 wherein the hole 10a, seismic charge 12a and the earth's surface 14a are similar to those shown in FIGURE 1. However, in this case instead of digging a reservoir to carrying the absorbing layer, a layer 18 contained by retaining wall 20 is provided on the earth's surface 14a. In some instances this method may be easier and preferable to the reservoir method shown in FIGURE 1. However, the same principles are applicable as again the layer 18 prevents the downward reflection of upwardly propagating waves.

As a further alternative, the invention contemplates that, in at least certain applications, if the surface of the ground above the charge is merely wetted down well or a very thin layer of absorbent material applied to the earth's surface above the charge, that most of the advantages of the invention are achieved. Of course, this method would probably be the most inexpensive, and easiest to accomplish, but in most cases would not reduce the interference as much as the methods shown in FIGURES 1 and 3 as described above.

The width, thickness, and nature of the substances in the layer, as described heretofore, will depend on the surface and substance strata involved for each particular situation. However, the invention is applicable to any surface condition, or sub-surface strata. It has been found that highly improved signal to noise ratios are obtained when utilizing this method to perform seismic prediction.

It will be recognized that the objects of the invention have been achieved by providing an absorbent layer in the area over a seismic charge in order to gradually diminish the energy carried in the upwardly propagating waves resultant from the charge to thereby substantially lessen the possibility of downward reflection from the earth's surface in order to greatly reduce noise interference in seismic measurements.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. A method of reflective and refractive seismic prospecting comprising the steps of:
   positioning a seismic charge below the earth's surface, and
   artificially creating an additional layer on the earth's surface overstanding the seismic charge by sprinkling liquids on the surface, with said layer having the capacity to diminish the amount of reflected energy in the seismic waves resultant from the detonation of the seismic charge that propagating upwardly normally have a substantial portion of their incident energy reflected downwardly from the earth's surface.

2. A method of reflective and refractive seismic prospecting comprising the steps of:
   positioning a seismic charge beneath the earth's surface,
   producing a flat shallow receptacle at the earth's surface substantially above the charge the width of said receptacle being substantially equal to about twice the vertical distance of the bottom of the receptacle to the charge,
   filling the receptacle with wave absorbing and deadening material so as to substantially eliminate any substantial reflection downwardly from the earth's surface of upwardly propagating waves cause upon detonation,
   detonating the charge, and
   measuring with a minimum of distortion the reflections from any sub-strata layers of the waves propagating from the detonation.

3. A method of reflective and refractive seismic prospecting comprising the steps of:
   positioning a seismic charge below the earth's surface,
   producing a layer on the earth's surface between the earth and the atmosphere in the area overstanding the seismic charge, the diameter of said layer being dependent on both the critical angle of incidence of upwardly propagating seismic waves determined by the refractive indexes of the boundary layers and the vertical distance between the charge and the boundary between said layer and the subjacent layer, said layer being capable of diminishing the amount of energy in the seismic waves resultnat from the detonation of the seismic charge which waves propagating upwardly normally have a substantial amount of incident energy reflected downwardly from the boundary of the earth's surface and the atmosphere.

4. A method of reflective and refractive seismic prospecting comprising the steps of:
   positioning a seismic charge below the earth's surface, and
   producing an additional artificial layer on the earth's surface between the earth and the atmosphere in the area overstanding the seismic charge, the diameter of said layer being dependent upon both the critical angle of incidence of upwardly propagating seismic waves determined by the refractive indexes of the boundary layers and the vertical distance between the charge and the boundary between said layer and the subjacent layer, said layer containing a liquid.

References Cited by the Examiner
UNITED STATES PATENTS

| 2,353,484 | 7/1944 | Merten et al. | 181 |
| 2,735,503 | 2/1956 | Rice et al. | 181 |
| 2,816,618 | 12/1957 | Piety | 181 |
| 2,989,135 | 6/1961 | Pierce et al. | 181 |

OTHER REFERENCES

Sears: Optics; Addison-Wesley Publishing Co., Reading, Mass. (1949), (pp. 43, 44, 173 and 174 relied on).

BENJAMIN A. BORCHELT, *Primary Examiner.*

W. KUJAWA, *Assistant Examiner.*